Jan. 23, 1940.　　　K. B. BRITTON　　　2,187,824
AUTOMATIC TRANSMISSION RATIO CHANGER
Filed Jan. 14, 1937　　　4 Sheets-Sheet 1
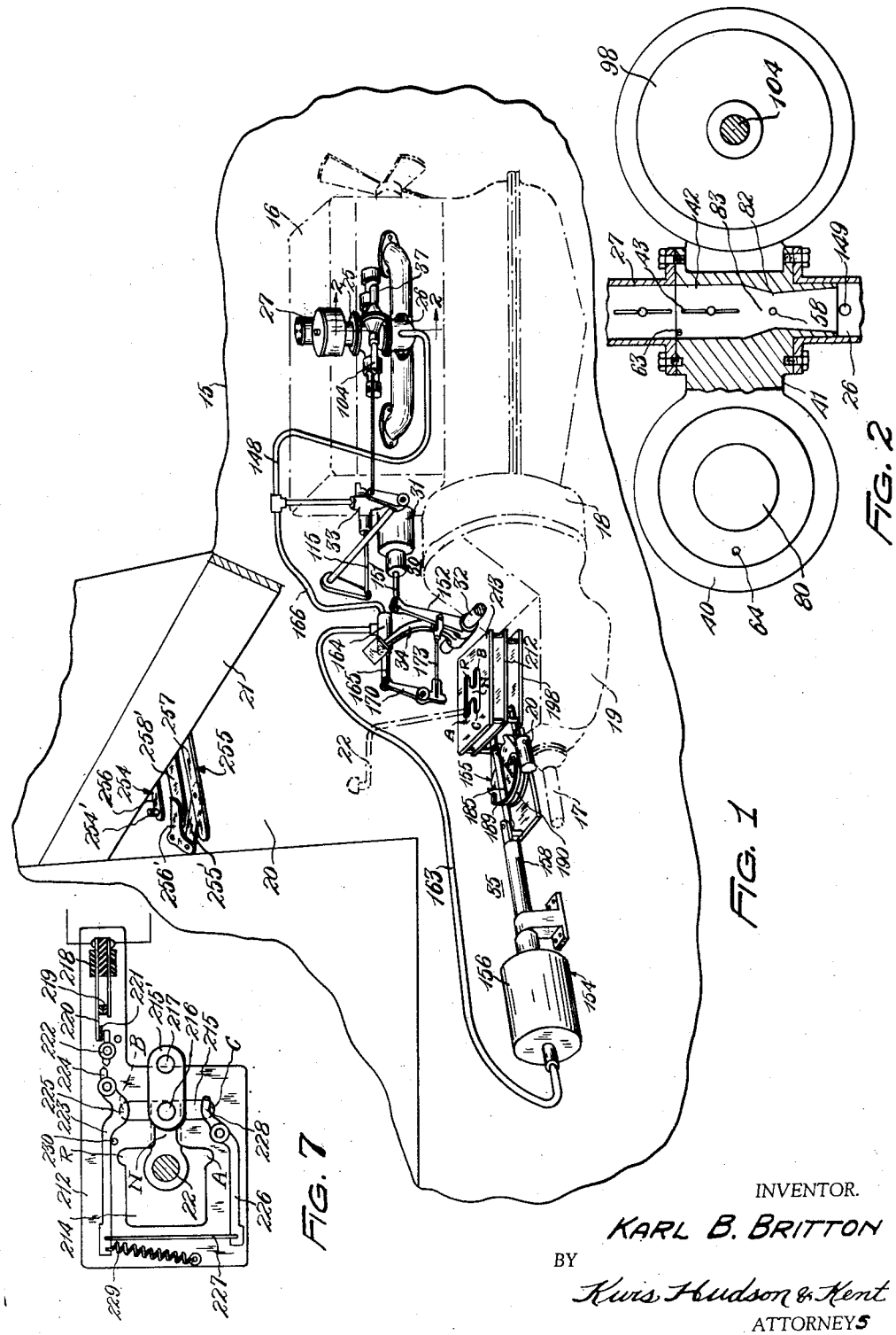
INVENTOR.
KARL B. BRITTON
BY
Kwis Hudson & Kent
ATTORNEYS INVENTOR.
KARL B. BRITTON
BY
Kwis, Hudson & Kent
ATTORNEYS

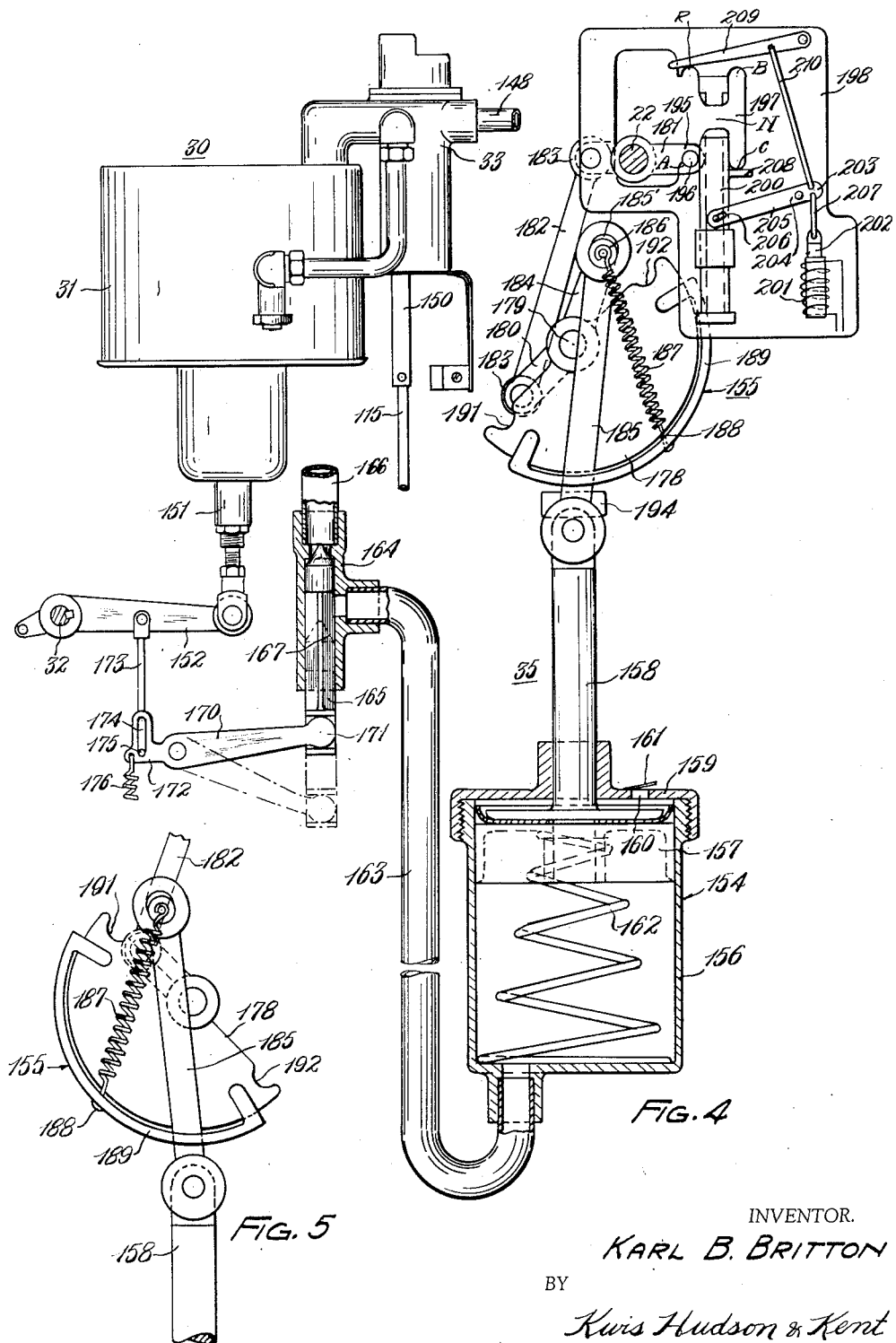

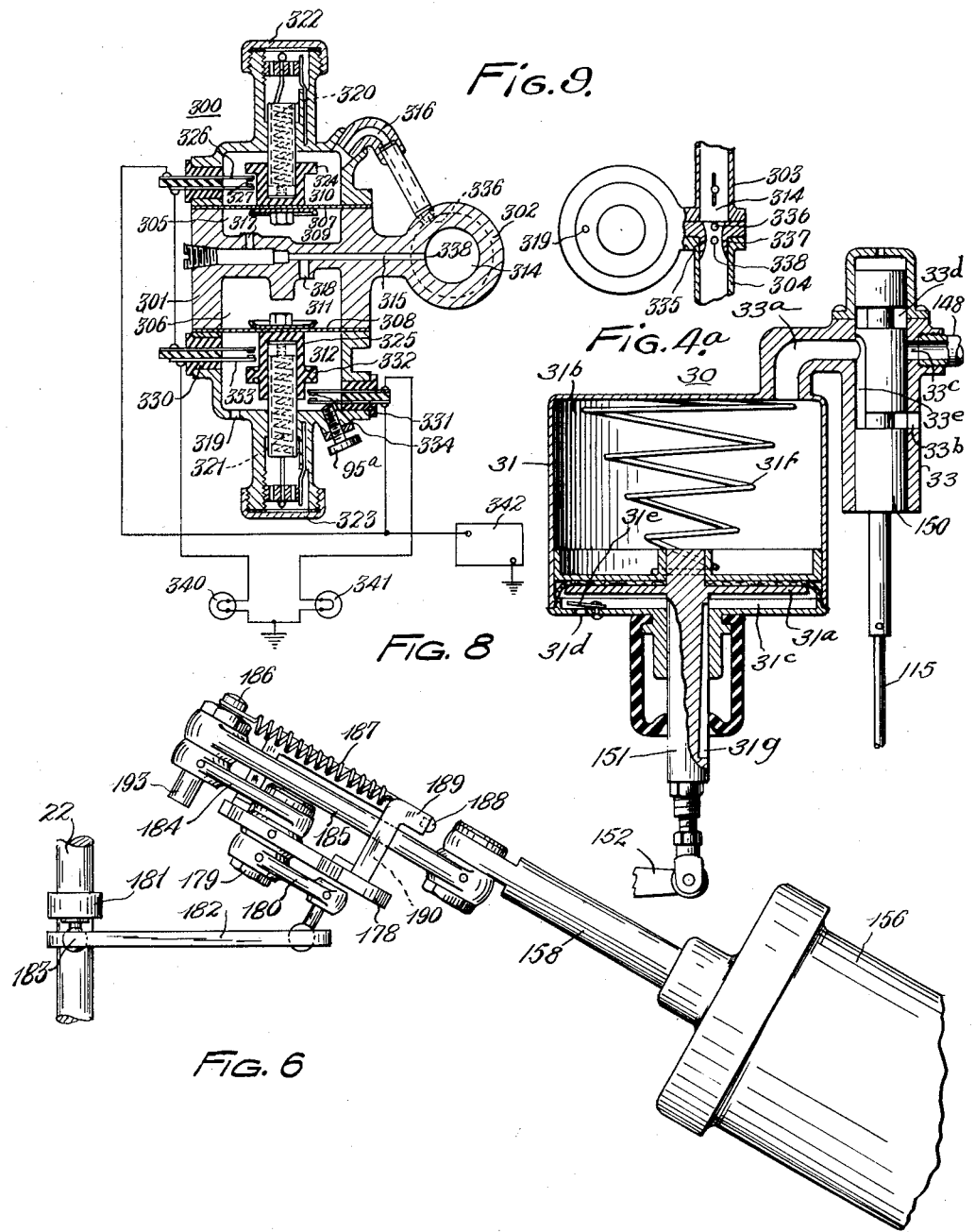

Patented Jan. 23, 1940

2,187,824

UNITED STATES PATENT OFFICE 2,187,824

AUTOMATIC TRANSMISSION RATIO CHANGER

Karl B. Britton, Cleveland Heights, Ohio, assignor to Britton Controls, Inc., Cleveland, Ohio, a corporation of Ohio Application January 14, 1937, Serial No. 120,526

29 Claims. (Cl. 192—.01)

This invention relates to speed control apparatus which is automatically operable to vary the power transmission ratio of a variable transmission, and more particularly to apparatus of this kind which is adapted for use on motor vehicles.

An object of the present invention is to provide novel mechanism for automatically determining the time and nature of changes needed in a power transmission ratio in accordance with existing speed and load conditions.

Another object of the invention is to provide control apparatus for a motor vehicle, comprising novel mechanism for automatically determining when a change is needed in the power transmission ratio in accordance with existing speed and load conditions and automatically effecting the needed change.

Another object of the invention is to provide a novel mechanism which is responsive to the pressure and velocity of the intake fluid of an internal combustion engine, or to either of these functions of the intake fluid, and which automatically determines when a change should be made in the power transmission ratio and the nature of the change needed.

Still another object of this invention is to provide speed change apparatus for a motor vehicle, embodying mechanism which automatically determines needed changes in the power transmission ratio in accordance with changes occurring in the pressure or velocity of the intake of the motor, and mechanism for automatically changing the power transmission ratio in accordance with the determined needed changes.

A further object of the invention is to provide novel speed change apparatus for a motor vehicle, embodying mechanism for automatically determining changes needed in the power transmission ratio and for automatically making such ratio changes, including means for automatically actuating the throttle of the vehicle in timed relation to the transmission ratio change being made.

Another object of my invention is to provide a novel device for automatically actuating the clutch of a motor vehicle.

A further object of my invention is to provide a novel device for automatically actuating the throttle of a motor vehicle to vary the engine speed while changes in the power transmission ratio are being made.

Yet another object of my invention is to provide a novel mechanism for automatically actuating the clutch and throttle of a motor vehicle in timed relation while changes in the power transmission ratio are being made.

It is also an object of this invention to provide a novel mechanism for automatically determining and sensually signalling the time and character of changes needed in the power transmission ratio of a motor vehicle according to existing speed and load conditions.

Other objects and advantages of the invention will be apparent from the following description when taken in conjunction with the accompanying sheets of drawings, wherein Fig. 1 is a perspective view, more or less diagrammatic, illustrating the general arrangement of the apparatus of my invention when applied to a motor vehicle;

Fig. 2 is a partial sectional view taken as indicated by line 2—2 of Fig. 1 and showing the unit which determines the changes needed in the transmission ratio;

Fig. 4 is a plan view, partly in section and more or less diagrammatic, showing the mechanisms for operating the shifter lever and the clutch;

Fig. 4a is a longitudinal sectional view taken through the clutch-actuating fluid motor and its control valve;

Fig. 5 is a detached partial plan view illustrating another position of a snap action device embodied in the shifter actuating mechanism;

Fig. 6 is a side elevation of a part of the same shifter actuating mechanism;

Fig. 7 is a plan view showing apparatus associated with the shifter lever for actuating one of the electric control switches;

Fig. 8 is a view, partly in section and more or less diagrammatic, showing a mechanism automatically operable for sensually signalling changes needed in the transmission ratio; and Fig. 9 is an elevational view, partly in section, showing the apparatus of Fig. 8 connected with the intake of an internal combustion engine.

Figure 3:
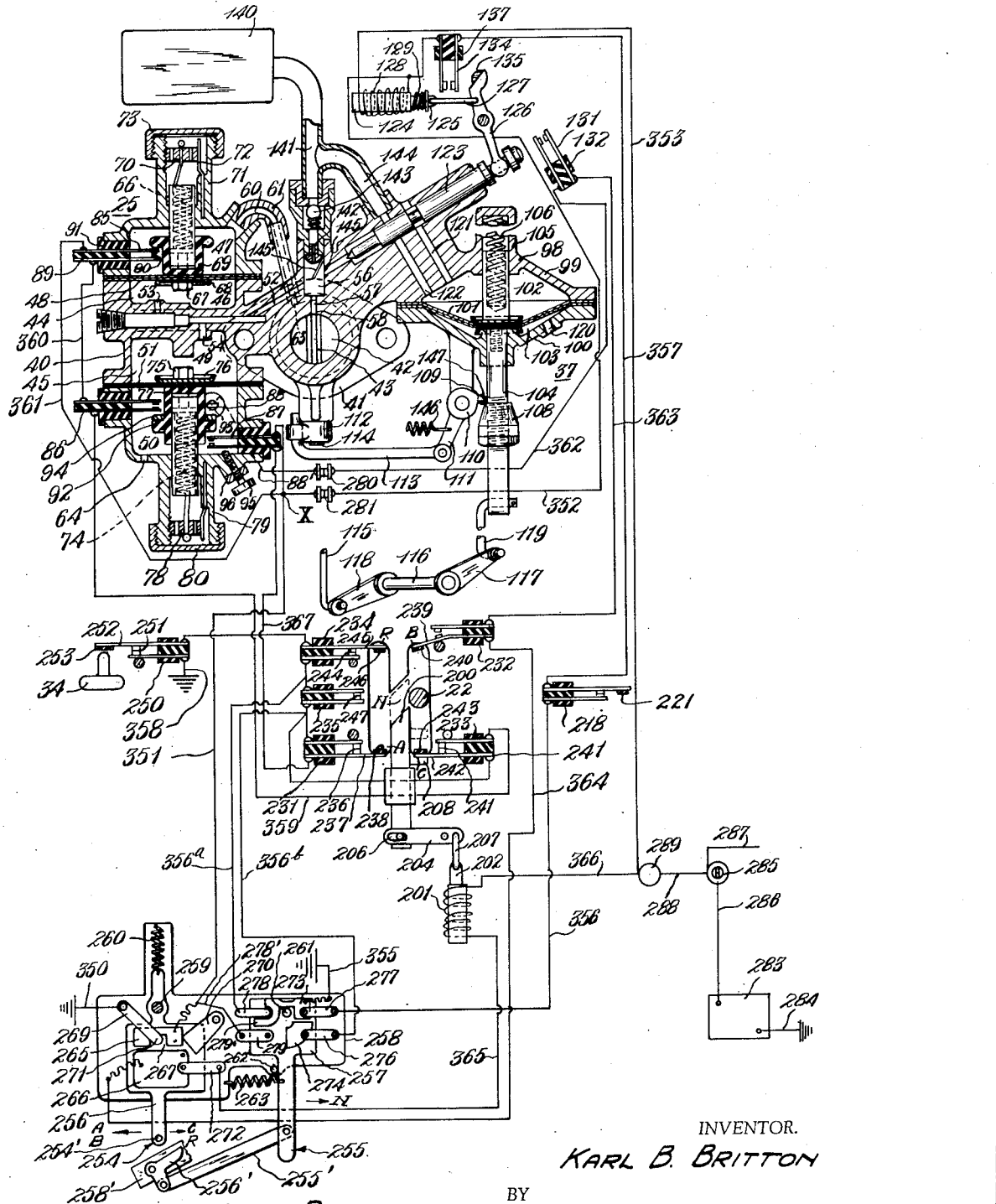
Fig. 3 is a plan view, partly in section and more or less diagrammatic, showing the change determining unit and throttle operating mechanism together with various electrical control circuits.

The apparatus of my invention is especially applicable to motor vehicles driven by internal combustion engines through variable transmissions and, in its preferred embodiment, operates to automatically determine when a change should be made in the power transmission ratio and the nature of the change, and automatically effects the change which has been determined to be needed. The principle of my invention may, of course, be embodied in various structural arrangements, some of which have been illustrated in the accompanying drawings.

Before proceeding with the detailed description of my control apparatus, it might be advantageously explained that, in general, my invention provides means for automatically determining the nature and time of changes needed in the power transmission ratio in accordance with existing speed and load conditions and also provides means for automatically putting into effect the transmission ratio changes which have been determined to be needed. The means for determining the transmission ratio changes may be conveniently referred to as the "brain unit". The means for automatically effecting the ratio changes embodies a plurality of associated mechanisms, comprising a clutch actuating unit or mechanism, and a unit or mechanism for actuating the shifter lever of the transmission device and which may be conveniently referred to as the shifter actuating unit. The means for automatically effecting the ratio changes also includes a unit or mechanism for automatically controlling the fuel supply for the engine, and which may be conveniently referred to as the shift throttle unit.

Without entering into a detailed description of the various units and their operation, it might be beneficial to explain at this point that when changes occur in the load against which the vehicle engine is working and in the engine speed, these changes affect the brain unit and enable the latter to determine when a shift or change should be made in the transmission ratio, and whether the shift should be "up" (from a high gear ratio to a lower gear ratio) or whether the shift should be a "down" shift (from a low gear ratio to a higher gear ratio). In addition to the function of determining when a shift should be made, and whether the shift should be up or down, the brain unit also performs three distinct control functions. One of these latter functions consists in controlling the clutch actuating mechanism or unit, another consists in controlling the shifter actuating mechanism or unit, and the third consists in controlling the shift throttle unit or mechanism.

My ratio changing apparatus, or change speed apparatus as it may sometimes be designated, may be applied to all of the various kinds of motor vehicles of the internal combustion type, and may be applied to such vehicles as accessory equipment or may be incorporated in the vehicles during the building thereof. In Fig. 1 of the drawings I have shown my ratio changing apparatus applied to a motor vehicle 15 of conventional type. The vehicle is here shown as having an internal combustion engine 16 operably connected with a propeller shaft 17 through a clutch device 18 and a transmission device 19. The vehicle is shown as being provided with a driving compartment 20 and as having an instrument board 21 in the driving compartment.

The transmission device 19 may be any well known type of transmission, such as a gear transmission, a hydraulic transmission or an electric transmission. The transmission device may have the usual manually operable shift lever or a corresponding control 22 extending therefrom into the driving compartment 20. The shift lever 22 constitutes a part of the usual shifting mechanism of the sliding-gear type transmission device 19 illustrated in this instance, whereby the setting of the transmission may be changed or shifted from one power transmission ratio to another, or to "reverse" or "neutral". The transmission device 19 may be one having five different settings or positions, comprising one reverse ratio, three different forward ratios, and a neutral position. As shown in Fig. 1, the shift lever 22 is in the position corresponding with the highest available forward ratio and this low speed position may be conveniently referred to as "first speed" or position A. The shift lever 22 may be moved to any of the other settings or ratios affording an intermediate speed, a high speed, reverse or neutral, and the other positions to which the shift lever may be moved to correspond with these settings are designated in Fig. 1 as positions B, C, R and N.

The brain unit, represented generally by the reference character 25, may be located at any one of the various suitable points adjacent the internal combustion engine 16, for example, in the case of an internal combustion engine of the Otto type, it may be associated with the intake manifold 26 and carbureter 27. The brain unit may be variously arranged with respect to the intake manifold and carbureter and, in fact, any relative positioning may be provided which will cause the brain unit to be affected in the desired manner in accordance with variations occurring in engine speed and load. One arrangement which I have found to be quite satisfactory is with the brain unit 25 disposed between the carbureter 27 and the intake fitting 26. In the present arrangement I have shown the carbureter 27 as being a down-draft carbureter, but it will be understood, of course, that the invention is not dependent upon any particular type of carbureter being used.

The clutch actuating unit is designated generally by the reference character 30, and comprises a power device, preferably a fluid motor 31 operably connected with the usual clutch shaft 32, and a valve 33 for controlling the fluid motor. The fluid motor 31 and its control valve 33 may be located in the engine compartment or at any other point where connection to the clutch shaft 32 may be conveniently made. The usual clutch pedal 34 may also be provided on the shaft 32 and arranged so that the shaft may be actuated either automatically by the unit 30 or manually by the pedal. The clutch itself may be any one of various available devices suitable for disconnecting an engine from the transmission. In some instances the clutch may be an automatic clutch, for example, a centrifugally operated clutch.

The shifter actuating unit, designated generally by the reference character 35, may be located adjacent the transmission device 19 and the shifter 22 projecting therefrom. The shifter actuating unit may be located either above or below the floor of the driving compartment 20, and in Fig. 1 of the drawings is shown as being located just rearwardly of the shift lever 22 to which the unit is operably connected.

The shift throttle unit 37 may be located at any one of various suitable points, for example, it may be arranged close to the brain unit 25 and the carbureter 27, and, if desired, the usual carbureter throttle may be used as the shift throttle. The unit 37 may embody a separate throttle, and, as shown in Fig. 2, may be located in the fuel intake.

The brain unit 25 will now be described more in detail, and from the structure illustrated in Figs. 2 and 3 of the drawings, it will be observed that this unit is provided with a diaphragm casing 40 and an intake fitting or conduit member 41. The casing 40 and the conduit member 41 may be constructed as a single metal casting or the like, so that the diaphragm casing will be supported from the member 41 when the latter is bolted or otherwise connected to the intake of the engine. The fitting 41 may be constructed in the forms of a flanged spacer unit or insert which may be disposed between, and have bolted connection with, the intake manifold 26 and the carbureter 27. The fitting 41 has a passage 42 therethrough which constitutes a part of the intake conduit when the fitting is arranged between the carbureter and intake manifold as just explained. When a separate shift throttle is employed, as mentioned above, it may be in the form of a butterfly valve 43 disposed in the passage 42 to constitute a part of the shift throttle unit to be described hereinafter.

The diaphragm casing 40 is constructed with a pair of chambers 44 and 45, and each of these chambers is separated into two compartments by a movable medium, preferably a flexible diaphragm. The chamber 44 is separated into two compartments 46 and 47 by a transversely extending flexible diaphragm 48. The chamber 45 is also divided into two compartments 49 and 50 by a transversely flexible diaphragm 51. The compartment 46 is connected with the passage 52 through the port 53, and the compartment 49 is connected with the passage 52 through the port 54. The passage 52 communicates with a pocket or chamber 56 formed in the intake fitting 41, and this pocket or chamber, in turn, communicates with the intake conduit 42 through a passage 57 and a port 58. Since all of the passages and ports just referred to are always open, it will be seen that the compartments 46 and 49 always communicate with the intake conduit 42 through the port 58.

The compartment 47 of the diaphragm casing is fluid-tight except for a passage 60 leading therefrom through a conduit member 61. The passage 60 also communicates with the intake conduit 42 through a port 63, and since the passage 60 and the port 63 are always open, the chamber 47 will always be in communication with the intake conduit through this port. The compartment 50 of the diaphragm casing communicates with atmosphere through a vent passage 64. The diaphragm 48 is adapted to be moved or flexed as the result of a pressure differential between the compartments 46 and 47, and may be conveniently referred to as a velocity diaphragm because the pressure differential between the compartments 46 and 47 is a function of the velocity of the fuel mixture flowing through the intake conduit 42 while the shift throttle 43 is open. The diaphragm 51 is adapted to be moved or flexed as the result of a pressure differential between the compartment 49 and the compartment 50. This diaphragm may be conveniently referred to as the vacuum diaphragm because the compartment 49 always communicates with the intake conduit 42 and the compartment 50 always communicates with atmosphere, and hence the pressure differential acting on this diaphragm is always a function of the vacuum or sub-atmospheric pressure existing in the intake conduit.

Provision may be made for adjusting or calibrating the resistance which the diaphragms 48 and 51 offer to flexing. The adjustment for the diaphragm 48 may comprise a tension spring 66 which has one end thereof connected to the diaphragm by means of the screw 67 and the clamping members 68 and 69 disposed on opposite sides of the diaphragm. The other end of the spring is connected to a nut 70 which is adjustably threaded into an opening of the casing extension 71. The resistance of the diaphragm 48 may be calibrated by adjusting the nut 70 to vary the tension of the spring 66. The nut may be retained in the desired position of adjustment by means of the spring detent 72. Access may be had to the adjusting nut 70 through the outer end of the extension 71 which may be closed from atmospheric and against the entry of foreign material by the removable cover 73.

The adjusting or calibrating means for the diaphragm 51 is similar to that just described for the diaphragm 48, and comprises a tension spring 74 having one end thereof connected to the diaphragm 51 by means of the screw 75 and the clamping members 76 and 77 disposed on opposite sides of the diaphragm. The other end of the spring is connected with an adjusting nut 78 disposed in the casing extension 79 just inwardly of a removable cover 80.

In order that the pressure differential existing between the compartments 46 and 47 may be a function of the velocity of the intake fluid, as explained above, I construct the passage 42 of the intake member 41 in the form of a Venturi tube, as shown in Fig. 2 of the drawings. A restriction 82 in the intake passage 42 forms the throat 83 of the Venturi tube, and it will be noted that the port 58 communicates with the intake passage 42 substantially at the throat of the Venturi tube. The port 63 communicates with the Venturi tube at a point spaced from the restricted throat 83 as shown in Fig. 2. Thus the pressure existing in the compartments 46 and 49 will be transmitted from the throat of the Venturi tube through the port 58 and the pressure existing in the compartment 47 will be the pressure transmitted from the large part of the Venturi tube through the port 63. From the arrangement just described it will therefore be seen that the diaphragm 48 responds to changes in the velocity of the mixture flowing in the intake passage 42 and the diaphragm 51 responds to changes in the vacuum or sub-atmospheric pressure occurring in this passage.

Movements of the diaphragm 48 are utilized to actuate an electric switch 85, and movements of the diaphragm 51 are utilized to actuate electric switches 86, 87, and 88. These electric switches may be of any suitable construction, for example, each may comprise spring elements 89 which carry contact elements 90. The spring elements may extend through an insulating body 91 which is mounted in an opening of the wall of the casing 40. The spring elements of the switch 85 extend into the compartment 47 in position to be engaged by the clamping member 69 which may be constructed of suitable insulating material. The switches 86, 87, and 88 extend into the compartment 50 to be actuated by movement of the clamping member 77 which may also be formed of suitable insulating material. The switches 86 and 88 are disposed on one side of a laterally projecting flange 92 of the member 77, and the switch 87 is disposed on the opposite side of the flange 92, so that movement of the diaphragm 51 in a direction caused by an increase in vacuum (decrease in absolute pressure) in the intake passage 42 closes the switches 86 and 88 and movement of the diaphragm 51 in the opposite direction closes the switch 87. The switch 85 is normally open but is closed upon movement of the diaphragm 48 in response to an increase in the velocity of the fluid flowing in the intake passage 42.

The switch 88 may have only one of the spring elements 89 which has a contact element 93 adapted to be engaged by a metal ring 94 carried by the lateral flange 92 of the clamping member 77. The contact element 93 of switch 88 is engaged by the metal ring 94 only when the vacuum is high, at which time this metal ring also engages one of the elements of switch 86 to thereby cause a closing of the latter switch as well as a closing of switch 88. A lead 88' is connected to the spring element of the switch 88.

Adjusting means may be provided for the lower spring element of the switch 87 so as to permit calibration of this switch with respect to the switches 86 and 88. This adjusting means may comprise a screw 95 formed of insulating material. The screw extends through a wall of the casing 40 with the inner end thereof in cooperating engagement with the lower spring element of the switch 87, and is provided with a lock nut 96 so that it may be locked in a desired position of adjustment. The screw 95 provides an adjustment for the down shift and is needed because when the tension of spring 74 is changed to vary the speed at which a full throttle up shift takes place, it also affects the speed at which a down shift takes place.

Since the throttle unit 37 is closely associated with the brain unit, so far as position and function are concerned, I will next proceed to describe the detailed construction of this unit. The shift throttle unit is provided with a power device 98 for actuating the shift throttle 43 and the valve 33 of the clutch actuating unit 30. The power device 98, as shown in this instance, may be a fluid pressure motor. This power device is provided with a casing 99 which may be supported from the intake fitting 41 by having a portion of the casing formed integral with the intake fitting as shown in Fig. 3 of the drawings. The casing 99 includes a cover 100 and is provided with a movable diaphragm 101 which divides the chamber of the casing into compartments 102 and 103.

A reciprocable rod 104 is slidable in an opening of the cover 100 and is connected with the diaphragm 101 so as to be actuated thereby. An extension 105 of the casing 99 contains a spring 106 which acts on the diaphragm to normally urge the same toward the cover 100. The rod 104 carries a cam 108 which, upon movement of the rod, engages an arm 109 of a bell crank lever 110. The other arm 111 of the bell crank lever is connected with a lever 112 by means of a link 113. The lever 112 is pinned or otherwise secured to the shaft 114 of the shift throttle 43. The rod 104 is also connected with the actuating member 115 of the valve 33, such connection being made through suitable linkage, including the rock shaft 116 having levers 117 and 118 mounted thereon and a link 119 connecting the rod 104 with the lever 117.

The cover 100 of the casing 99 is provided with an opening 120 which connects the compartment 103 with atmosphere. The compartment 102 on the opposite side of the diaphragm 101 may be connected either with atmosphere or with the intake passage 42. For this purpose I provide passages 121 and 122 which communicate with the compartment 102 and are controlled by a movable valve 123. When the valve 123 is in the position shown in Fig. 3 of the drawings the passage 121 connects the compartment 102 with the atmosphere and the passage 122 is closed. When the valve 123 is moved outwardly the passage 121 is closed and the passage 122 is connected with the pocket 56 which, in turn, is connected with the intake passage 42 through the passage 57 and the port 58.

The valve 123 may be actuated in various ways, for example by a solenoid 124 having the plunger 125 thereof operably connected with the valve by means of the pivoted lever 126 and the link 127. The plunger of the solenoid is normally retracted from the coil 128 by means of a spring 129, but when the winding is energized the plunger is drawn inwardly and the valve 123 is shifted to its outer position.

An electric switch 131, which will later be referred to as a synchronizing switch, is disposed adjacent the valve 123, so that when the latter is moved outwardly the contacts of the switch will be closed. The switch contacts are normally open but are closed upon outward movement of the valve 123. The switch 131 may be suitably supported adjacent the valve 123 by a mount 132 formed of insulating material.

Another electric switch 134, which will later be referred to as a holding circuit switch, is arranged adjacent the lever 126 so as to be actuated by movement of this lever. The contacts of the switch 134 are normally open, but when the lever 126 is rotated to move the valve 123 to its outer position, the switch 134 is engaged and closed by an element 135. This element is mounted on the lever 126 and is formed of insulating material. The switch 134 may be suitably supported adjacent the lever 126 by a mount 137 formed of insulating material.

If desired, the shift throttle unit may include a vacuum storage tank 140 having a conduit 141 connected with the pocket 56 through a restriction 142 and controlled by a check valve 143. The check valve is arranged to permit fluid to be withdrawn from the tank 140 but to prevent a return flow thereinto. A branch conduit 144 connects the tank 140 with the passage 122 so that when the valve 123 is moved to its outer position the tank 140 will be in communication with the compartment 102. A second check valve 145 is arranged to close the port 145' of the pocket 56 in the event that the vacuum of the tank 140 is stronger than the vacuum of the manifold at the time that the valve 123 is moved to its outer position.

A tension spring 146 may be connected with the arm 111 of the bell crank 110 so as to normally hold the shift throttle 43 in the open position shown in Fig. 2 and to also normally hold the bell crank 110 in position for the roller 147 of the arm 109 to be engaged by the cam 108.

The clutch actuating unit 30, which is best shown in Figs. 4 and 4a will next be described in detail. As mentioned above this unit includes a power device in the form of a fluid motor. This fluid motor may be of a construction known in the art and may comprise a cylinder 31 having a piston 31a therein and chambers 31b and 31c on opposite sides of the piston. One of the chambers, namely the chamber 31c, communicates with atmosphere through a passage 31d controlled by an inwardly opening check valve 31e and the other chamber is connected with the intake manifold through the valve 33 and the conduit 148. The conduit 148 communicates with the intake manifold through the port 149 (see Fig. 2) and is controlled by the movable element 150 of the valve 33.

The casing of the valve 33 has a passage or port 33a which connects with chamber 31b of the cylinder 31 and also has ports 33b and 33c which connect, respectively, with atmosphere and with suction conduit 148. The valve element 150 has grooves 33d and 33e therein the first of which serves to connect the chamber 31b with the suction conduit 148 when the valve element is shifted to its outer position and the other of which serves to connect the chamber 31b with atmosphere when the valve element is moved to its inner position as shown in Fig. 4a.

The piston 31a has a piston rod 151 which projects from the cylinder and is connected with the clutch actuating lever 152. A compression spring 31f is adapted to be stressed when the piston 31a is moved inwardly and serves to subsequently return the piston to the position shown in Fig. 4a. During inward movement of the piston, air enters the chamber 31c freely past check valve 31e and also through a tapered groove 31g in the piston rod. On the return or outward movement of the piston 31a air escapes from chamber 31c through the groove 31g but at a progressively decreasing rate so as to prevent "slamming" of the piston.

When the valve element 150 is moved to its outer position the chamber 31b is connected with suction conduit 148 and the piston 31a is shifted inwardly causing the lever 152 to operate the clutch shaft 32 in a direction to disengage or release the clutch. When the valve element 150 is moved to its inner position the chamber 31b is vented to atmosphere thus permitting the spring 31f to return the piston 31a and cause actuation of the lever 152 and the shaft 32 in a direction to reengage the clutch. It will be understood, of course, that disengagement of the clutch by actuation of the lever 152 and the shaft 32 disconnects the engine 16 from the transmission device 19 to permit shifting of the transmission from one ratio to another, and that reengagement of the clutch restores the driving connection between the engine and the transmission after the desired shift has been made.

The shifter actuating unit 35 will next be described in detail. This shifter actuating unit may include a power device 154 which is operably connected with the shifter lever 22 through a snap action device 155. The snap action device, as will be explained presently, permits the use of a single acting reciprocating power device for moving the shifter lever 22 to its forward and rearward position. It should also be mentioned that the snap action device 155 is in itself a novel device which is adapted to be applied to a variety of different uses.

The power device 154 of the shifter actuating unit, as best shown in Fig. 4 of the drawings, comprises a cylinder 156, having a piston 157 operable therein and connected with a piston rod 158 which projects from the cylinder and is slidable in an opening of the cylinder cover 159. A vent passage 160 in the cylinder cover provides a connection for one end of the cylinder to the atmosphere. A control for the vent 160 may be provided, for example, in the form of a "leaky" check valve 161 which causes the inward or rearward movement of the piston to take place slowly and the forward movement to take place quickly. For this control I may use a flap formed of fabric or the like. A spring 162 is disposed in the cylinder on the opposite side of the piston and normally biases or urges the piston in a forward direction, that is, towards the cylinder cover 159. A conduit 163 connects with the cylinder 156 at the side of the piston opposite the vent passage 160. The other end of this conduit communicates with a valve casing 164 in which a movable valve element 165 is arranged to control the transfer of pressure fluid through the conduit. Another conduit 166 connects the valve casing 164 with the conduit 148 which, in turn, is connected with the intake manifold through the port 149 as explained above.

The valve element 165 is arranged in the casing 164, such that when it is in the position shown in full lines in Fig. 4, the conduit 166 is closed and the conduit 163 is open to atmosphere through the fluted passages 167 formed in the stem of the valve element. When the valve element is moved outwardly of the casing 164 to the dotted line position indicated, the conduit 163 is no longer open to atmosphere but is connected to the conduit 166 to cause a sub-atmospheric condition to be created in the cylinder 156. When this occurs air pressure entering the cylinder through the opening 160 acts on the piston and causes a power stroke thereof.

The valve element 165 may be actuated by a pivoted lever 170, which has the arm 171 whereof operably connected with the valve element and an arm 172 connected with the clutch lever 152 by means of the link 173. The arm 172 is preferably formed with a slot 174 in which the end 175 of the link 173 engages. The slot and link end provide a lost motion connection such that the valve element 165 will be actuated after a predetermined movement of the clutch lever 152 occurs. A tension spring 176 may be arranged to act on the pivoted lever 170 to normally hold the valve element 167 in its closed position. It will thus be seen that with this lost motion connection and the arrangement provided, the valve 165 will be opened to cause a power stroke of the piston 157 for making the shift only after the clutch has been disengaged by a power stroke of the piston of the device 31.

As mentioned above, the piston rod 158 of the power device 154 is connected with the shifter lever 22 through a snap action device 155. This snap action device is arranged just rearwardly of the shifter lever 22 and may include a semicircular plate 178 which is pinned to the shaft 179, and a lever 180 which is also pinned to the shaft 179. A connecting member 181, which may be clamped or otherwise secured to the shifter lever 22, is operably connected with the lever 180 by a link 182. The ends of the link 182 are connected, respectively, with the lever 180 and the connecting member 181 by ball connections 183 which permit a desired extent of pivotal movement between the connected parts. A link 184 is disposed just above the plate 178 and has one end thereof pivoted on the shaft 179 so as to permit swinging of the link relative to the plate. The other end of this link is connected with the outer end of the piston rod 158 by a relatively longer link 185. The connections between the ends of the link 185 and the piston rod 158 and the link 184, are pivotal connections adapted for swinging movement, as shown in Figs. 4 and 5. Since the links 184 and 185 are of different lengths and swing about different centers, the pivotal connection therebetween should allow for relative shifting as by providing the link 185 with an oblong or elliptical opening 185' into which the upper end of a pin 186, carried by the link 184, extends. A tension spring 187 has one end thereof connected with the pivot pin 186 and the other end thereof connected with the plate 178 at a point 188 which is substantially opposite the axis of the shaft 179 and at or adjacent the mid-point of the arc defining the curved edge of the plate. The connection between the spring and the plate 178 may be conveniently made by means of a curved raillike member 189 which has the ends thereof connected to the plate and the intermediate portion thereof spaced above the arcuate edge of the plate to provide a slot 190 to accommodate the link 185. The spring 187 is connected to the pivot pin 186 and to the intermediate portion of the rail member 189 so as to lie above the plane of the link 185, as shown in Fig. 6.

The plate 178 is provided with abutment notches 191 and 192 at opposite sides of the shaft 179 and at a distance from the axis of the shaft corresponding substantially with the spacing of the pivot pin 186 from the shaft by the lever 184. The abutment notches alternately receive the downwardly projecting part 193 of the pivot pin 186 so that the plate may be rotatably driven in one direction or the other by pulling force transmitted through the link 185.

In the construction and arrangement of the snap action device shown in Fig. 4, the link 182 extends at an angle of approximately 30° to the longitudinl axis of the vehicle when the shifter lever 22 is in neutral position. With this link 182 disposed at this angle I find that the shifter lever can be caused to move into any one of the four various transmission settings, or into its neutral position, by simple pushing or pulling forces transmitted through the link. Assuming, for example, that the parts are in the positions shown in Fig. 4, a power stroke of the piston 157 would now cause the pivot pin 186 to be swung in a clockwise direction and to engage in the abutment notch 192. Following such engagement the plate 178 would be rotated in a clockwise direction and the lever 180 would be rotated in the same direction to cause a pushing force to be transmitted to the shifter lever 22 through the link 182. During the clockwise rotation of the plate 178, the anchored end 188 of the spring 187 is also shifted in a clockwise direction, thereby moving this anchored end to a new setting or position at the opposite side of the link 185.

Following its power stroke the piston is moved outward under the action of the spring 162 and this movement may be limited as by a suitable stop 194 arranged to be engaged by the outer end of the piston rod 158. While the piston is being returned by the spring 162 the link 185 causes the link or arm 184 to swing on the shaft 179 to thereby shift the spring anchor 186 across the line of dead center and thus tension the spring 187. The tension of the spring 187 thereupon causes the pivot pin 186 to be swung in a counter-clockwise direction, which results in the links 184 and 185 assuming a position relative to the plate 178 similar to that shown in Fig. 5 of the drawings. With the parts in this position it will be seen that upon the next power stroke of the piston 157 the pivot pin 186 will engage in the abutment notch 191 and will rotate the plate 178 in a counter-clockwise direction. This movement of the plate will also swing the lever 180 in a counter-clockwise direction and cause a pulling action to be exerted on the shifter lever 22 through the link 182, and will also move the anchor point 188 to the position shown in Fig. 4.

The connecting member 181, which is attached to the shifter lever 22, may be constructed with an extension part or arm 195 which carries a pin 196. During the shifting of the lever 22 to positions corresponding with the different transmission settings A, B, C and R, the pin 196 moves to corresponding positions of an H-like opening 197 of the deck or plate 198 through which the shifter lever extends. When the pin 196 is in reverse position D, or in the second speed position B, it will be observed that a pulling action is required to be transmitted through the link 182 to move the pin to the high speed position C or to the first speed position A. Similarly, when the pin is in first speed position A, or in high speed position C, a pushing force transmitted through the link 182 is required to shift the pin to either the reverse position R or the second speed position B.

To prevent the pin 196 from passing through the neutral space N when it is not desired to have it do so, such as when the pin is intended to be moved from the second speed position B to the high speed position C, I provide a movable member 200 which, because of its ability to close the passage through the neutral space N, may be conveniently termed a "gate". The gate 200 may be mounted on the deck 198 for reciprocating movement to control the neutral space N and may be projected into the neutral space by means of a solenoid 201. The solenoid has a plunger 202 which is connected with an arm 203 of a pivoted lever 204. The opposite arm 205 of the lever is pivotally connected to the gate 200 by a pin and slot connection 206. Energization of the solenoid shifts the plunger 202 into the coil and the pull thereby exerted on the lever 204 through the link 207 projects the gate 200 into the neutral space N.

Provision is made for retracting the gate 200 so as to leave the neutral space N unobstructed and this retracting means may consist of a lug 208 projecting from the gate, and a lever 209 pivoted on the deck 198. The lug 208 projects laterally toward the high speed position C and is adapted to be engaged by the pin 196 when the latter moves rearwardly into the high speed position. The lever 209 is arranged with the free end thereof extending adjacent the reverse position R, so that it will be engaged and shifted by the pin 196 upon movement of the latter into the reverse position. Such shifting of the lever 209 acts through a link 210 connecting the same with the lever arm 203 and causes retraction of the gate 200. The actuation of the gate in timed relation to the various other devices will be explained hereinafter as a part of the general description of operation.

Reverting now to Fig. 1 of the drawings, it will be observed that in addition to the deck 198 supporting the gate actuating mechanism, I may provide one or more other decks 212 and 213 spaced thereabove. The deck 212 may be utilized to support a completion switch and actuating mechanism therefor, which will be presently explained in detail, and the deck 213 may provide a support for a plurality of switches which prevent incorrect shifting of the lever 22 and may be conveniently referred to as "inhibitor" switches.

In Fig. 7 of the drawings I show the deck 212 as having an opening 214, through which the shifter lever 22 extends, and also having an H-like opening 215 having portions corresponding with the four transmission positions A, B, C, R and a transverse opening or neutral space N. The shifter lever 22 has an arm 215' extending laterally therefrom and provided with pins 216 and 217. The pins 216 and 217 are spaced apart to correspond with the lateral spacing of the transmission positions B and C.

A completion switch 218 is supported on the deck 212 and has normally closed circuit controlling contacts 219. For a purpose which will appear hereinafter it is desirable to have the completion switch opened and immediately reclosed as each shift of the lever 22 is completed. For this purpose I provide one of the switch elements with an extension 220 which has a contact part 221 formed of insulating material and adapted to be engaged by one arm of a swinging pawl or lever 222. A lever 223 is also pivoted on the deck 212 and has a lug 224 projecting therefrom for wiping contact with the pawl 222. An offset portion 225 of the lever 223 is arranged to overlie the gear ratio position B so that it must be engaged by either the pin 216 or the pin 217 when the shift lever is moved forwardly by the link 182. Another lever 226 is pivoted on the deck 212 and has one arm thereof connected to the lever 223 by a link 227. The other arm 228 of the lever 226 overlies the high speed position C, so that it must necessarily be engaged and moved by either the pin 216 or the pin 217 when the shift lever 22 is moved rearwardly by the link 182. A tension spring 229 has one end thereof anchored to the deck and the other end connected to the lever 223. This spring normally holds the lever 223 against the stop 230 and thereby retains the lever portions 225 and 228 in the positions just explained above. When either lever is engaged and swung by one of the shift lever pins, the lever projection 224 wipes across the pivoted pawl 222 and rotates the latter to cause the contacts 219 of the completion switch to be opened and immediately released for reclosing. A small spring (not shown) acts on the pawl 222 to normally return the same to position shown in Fig. 7.

I have mentioned above that a plurality of switches are mounted on the deck 213, and in Fig. 3 of the drawings I show a diagrammatic arrangement of these switches. These switches are five in number, one being provided for the neutral position and one for each of the four different transmission settings or ratio positions. In Fig. 3 the four ratio position switches are designated 231, 232, 233 and 234, and the neutral position switch is designated 235. Inhibitor switch 231 has normally closed contacts 236 and has a projecting arm 237 provided with an insulating contact part 238 adapted to be engaged by the shift lever 22 to cause opening of the switch when the latter is moved to the first speed position A. The inhibitor switch 232 is normally open, as shown in the drawings, but has a projecting arm 239 with an insulated contact part 240 adapted to be engaged by the shift lever to cause closing of the switch when the lever is moved to the second speed position B. Switch 233 has normally closed contacts 241, and a projecting arm 242 provided with a contact part 243 formed of insulation to be engaged by the shift lever 22 to cause opening of the switch when the lever is moved to the high speed position C. Similarly, the inhibitor switch 234 has normally closed contacts 244, and a projecting arm 245 provided with a contact part 246 formed of insulating material adapted to be engaged by the shift lever to cause opening of the switch when the shift lever is moved to the reverse position R.

The switch 235, which also acts as a completion switch when the operator initiates a shift of the lever 22 into the neutral position by actuation of the hereinafter described switch 255, is so arranged that the normally closed contacts 247 thereof will be opened whenever the shift lever is moved into the neutral position and will be held open as long as the shift lever remains in any part of the neutral slot N. This desired result may be obtained as by arranging the switch 235 so that some part thereof will be engaged by the shift lever or a member actuated thereby whenever the shift lever moves into the neutral slot.

The completion switch 218, but without the actuating means therefor, has been included in the diagrammatic circuit arrangement of Fig. 3 to facilitate the explanation of the circuits which will be traced hereinafter.

In addition to the switches already mentioned, I provide another inhibitor switch 250 adjacent the clutch pedal, or equivalent member, and which is arranged to be actuated upon the occurrence of a predetermined disengaging movement of the clutch. This switch has normally closed contacts 251 and a projecting arm 252 carrying a contact part 253 formed of insulating material. The inhibitor switch 250 is arranged relative to the clutch operating pedal or lever so that movement of such member in a direction to disengage the clutch will cause the same to engage the contact part 253 to open the switch contacts 251. In all cases I provide for operation of this inhibitor switch such that the switch will be opened whenever the clutch is disengaged and will be closed whenever the clutch has been reengaged.

At some point available in the driver's compartment 20, such as on the instrument board 21, I provide a pair of manually operable switches 254 and 255. These switches provide means for manually selecting a desired shift and establishing electric control circuits which initiate the automatic performance of the shift. These control switches 254 and 255 may comprise lever-like members 256 and 257 formed of insulating material and mounted upon a panel 258 also formed of insulating material. The lever 256 is adapted to be swung about a pivot 259 and is normally held in the position shown in Fig. 3 by the tension spring 260. The lever 257 is adapted to be swung about a pivot 261, but is normally held in engagement with the stop 262, as shown in Fig. 3, by the tension spring 263.

The switch lever 256 carries contact plates 265 and 266, the plate 265 preferably having a recess 267 formed in the edge thereof. A pair of contact arms 269 and 270 are mounted on the insulating panel 258 at opposite sides of the pivot 259. The contact arm 269 bridges over the contact plate 265 and has an end part 271 forming a contact element which is disposed in the opening 267 when the switch lever 265 is in the position shown in Fig. 3. Swinging movement of the switch lever 256 in either direction causes the end part 271 of the switch arm 269 to make electric contact with the contact plate 265. The contact arm 270 constitutes a jumper or bridge member which engages and electrically connects the contact plates 265 and 266 whenever the switch lever 256 is swung toward the right.

A contact arm 272 is mounted on the insulating panel 258 and normally engages the contact plate 266 when the switch lever 256 is in the position shown in Fig. 3, but when the switch lever is swung toward the left the contact plate 266 moves out of electric contact with the contact arm.

The switch lever 257 has a pair of spaced contact plates 273 and 274 mounted thereon, and the insulating panel 258 has four contact fingers 276, 277, 278 and 279 mounted thereon with the free ends thereof overlying the switch lever. When the switch lever 257 is in the position shown in Fig. 3, the contact finger 276 electrically engages the contact plate 274 and the contact finger 277 electrically engages the contact plate 273. Upon swinging movement of the switch lever 257 toward the right, the contact plate 274 moves beneath the contact finger 277 and into electrical engagement therewith. At this time the contact plate 273 moves out of engagement with the contact finger 277 and into engagement with the contact finger 278. In this connection it will be noted that the contact plate 274 is made of sufficient size to remain in electrical engagement with the contact finger 276 during the swinging of the switch member 257 and thus forms a means for electrically connecting the contact fingers 276 and 277. The contact finger 279 is connected with the conductor 351 by a lead 278' and is arranged to be engaged by an angularly extending arm portion 279' of the contact plate 273 when the switch lever 257 is swung to the right.

The circuits controlled by the dash switches 254 and 255 will be explained in detail hereinafter, but for the present it is sufficient to explain that upon movement of the switch lever 256 toward the left the apparatus is rendered automatically operable to move the shift lever 22 into first or second speed positions A or B, depending upon whether the lever 22 is in position B, C, or R at the time the lever 256 is thus moved. When the switch lever 256 is swung toward the right, the automatically operating mechanism will cause the lever 22 to be shifted either into high speed or into reverse. Whether the shift is into the high speed C or reverse position R is determined by whether the shift lever is in second speed position B or first speed position A.

If the shift lever 22 is in the right-hand portion of neutral position N a movement of switch lever 256 toward the left will put the shifter lever into first speed position A, while a movement of this switch lever 256 toward the right will put the shifter lever into third speed position C. When the shift lever 22 is in the left-hand portion of the neutral slot N a movement of switch lever 256 toward the left will put the shift lever into second speed position B, while a movement of the switch lever toward the right will cause the shift lever to be moved to reverse position R.

Whenever the operator swings the switch lever 257 toward the right, and holds it there until the shift is completed, the automatic mechanism is caused to shift the lever 22 into its neutral position. To establish the circuits required to initiate and carry out this shift into neutral it is necessary that the switch lever 256 be swung to the left at the same time that the switch lever 257 is swung to the right.

For causing this simultaneous movement of the switch lever 256 I provide a suitable operating connection to the switch lever 257, which connection may include a pin 254' carried by switch lever 256 and a dog 256' actuated from the switch lever 257. The dog 256' may be in the form of a bell crank lever pivoted on a suitable stationary support 258' and having one arm connected with the switch lever 257 by a link 255'. When the switch lever 257 is swung to the right, the dog 256' will engage the pin 254' and cause the switch lever 256 to be swung to the left at the same time. However, when the switch lever 256 is actuated by the driver to cause one of the above mentioned shifts, the pin 254' does not engage the dog 256' and hence no motion is transmitted to the switch lever 257. If desired, the pin 254' may be extended upwardly or downwardly from the switch lever 256 to form an available actuating part to be engaged by the operator's finger or hand.

In addition to the switches already described, I provide two shift throttle switches 280 and 281. These switches may be suitably supported and located adjacent the shift throttle operating lever 112 so that whenever the shift throttle is in its closed position these switches will be open. The switches 280 and 281 have contacts which close whenever the shift throttle is opened. Any suitable actuating means may be provided for the switches 280 and 281 to accomplish this desired result.

A suitable current source may be provided, such as the storage battery 283, for supplying electric current to energize the various circuits. The battery may be the storage battery usually provided on a motor vehicle and may have one terminal thereof grounded to the frame of the vehicle through the conductor 284. The other terminal of the battery may be connected with the usual ignition switch 285 by a conductor 286. A conductor 287 leads from the ignition switch 285 to the usual ignition circuit, and a conductor 288 leads from the ignition switch to a master switch 289. When this master switch is closed current is available for the various control circuits but when this switch, or the ignition switch, is open the apparatus is disabled.

Before proceeding with a detailed description of the operation of my change speed apparatus, it might be well to further point out briefly the functions of the various electric switches which have already been referred to. The sychronizing switch 131 controls the circuit for the gate operating solenoid 201 and prevents the gate 200 from being actuated except when a shift of the lever 22 is about to be made. When a shift is about to be made the switch 131 is closed by the outward movement of the valve 123 and permits the gate operating solenoid 201 to be energized, provided certain other switches in the gate solenoid circuit are then closed.

The holding switch 134, when closed by movement of the lever 126 corresponding with an outward movement of the valve 123, establishes a holding circuit for the solenoid 124. The purpose of the holding circuit is to retain the valve 123 in its outward or open position even after the initial circuit is broken, so that the diaphragm 101 will be retained in its innermost position and the shift throttle 43 will be thereby held in its closed position until the shift has been completed.

As above explained, the completion switch 218 is momentarily opened, and immediately reclosed, upon the completion of the movement of the lever 22 to any one of the four settings A, B, C, and R. When the completion switch is opened it breaks the holding circuit for the solenoid 124 and allows the valve 123 to be moved inwardly to its closed position by the action of the spring 129, whereupon the diaphragm spring 106 moves the rod 104 outwardly to disengage the cam 108 from the bell crank lever 110, thereby allowing the spring 146 to reopen the shift throttle 43. Outward movement of the rod 104 is also transmitted through linkage 119, 116 and 115 to the valve 150 to cause operation of the device 31 for reengaging the clutch and for disconnecting the cylinder 156 of the shifter unit 154 from the intake manifold suction.

The switches 85 and 86 of the brain unit are "up" shift switches and the switch 87 of the brain unit is a "down" shift switch. When the switches 85 and 86 are closed at the same time, they cause the solenoid 124 to be energized, which results in outward movement of the valve 123 and flexing of the diaphragm 101 to cause the shift throttle 43 to be closed and the vacuum valve 150 to be opened. Whenever the switch 87 is closed it also causes the solenoid 124 to be energized to close the shift throttle and open the vacuum valve 150 in the manner just explained above.

The switches 231, 232, 233, and 234 and the clutch switch 250 have all been referred to above as inhibitor switches. When the shift lever 22 is in first speed position A it holds the inhibitor switch 231 open and thereby prevents the apparatus from attempting to make a further down shift. Similarly, the switch 233 is held open when the lever 22 is in the high speed position C and prevents the apparatus from attempting to make a further up shift. The switch 232, as explained above, is normally open and is closed only when the lever 22 is in the second speed position B. When the shift lever 22 is in second speed position B the circuits for either an up shift or a down shift can be completed. The switch 234 is held open whenever the lever 22 is moved to the reverse position R, and whenever this switch is open the apparatus is rendered incapable of making any automatic shift.

The switch 235 is opened whenever the lever 22 is moved into neutral position, and when certain circuit connections have been made as explained hereinafter this switch acts as a completion switch for a desired shift into neutral position. So long as this switch is held open as the result of such a desired shift into neutral position, the apparatus is also rendered incapable of making any automatic shift.

The inhibitor switch 250 which is associated with the clutch pedal 34 or equivalent member is normally closed, but whenever the clutch is disengaged this switch is opened and so long as it remains open it renders the apparatus incapable of initiating any automatic shift.

The switch 280 which is referred to above as a shift throttle switch, is also a control switch for the energizing circuit of the gate operating solenoid 201. This switch is closed only when the shift throttle is open which means that preparatory to a shift being made this switch is in closed condition to permit energizing of the gate solenoid. Upon the initiating of a shift the shift throttle normally closes, and upon so doing it opens the switch 280 which causes deenergization of the gate solenoid circuit so that the gate can be retracted by the movement of the lever 22 in completing the shift.

The switch 281, which is likewise referred to as a shift throttle switch, is also closed only when the shift throttle is open. The purpose of this switch is to open the signal or control circuit so that an automatic shift will not be called for as the shift throttle is reopening, since at that time the vacuum and velocity in the intake do not reflect only the conditions of load and speed but are affected by the position of the reopening shift throttle.

To explain the operation of my automatic speed change apparatus more in detail, let it be assumed that the engine of the vehicle is running and that the master switch 289 has been closed so that current from the battery 283 will be available for enerezging the various circuits. Let it also also be assumed that the vehicle is standing still and that the shifter lever 22 is in the right-hand neutral position. With the shift lever in this position it will be remembered that the inhibitor switch 235 is held open and so long as this switch remains open automatic operation will not take place, even though the engine speed is varied by opening or closing of the throttle.

When the operator wishes to cause forward travel of the vehicle he moves the switch lever 256 toward the left and releases it. This causes the contacts of the switch 255 to establish an energizing circuit for the solenoid 124, which results in the valve 123 being opened by the solenoid and in the synchronizing switch 132 and the holding switch 134 being closed as the valve 123 is moved to its open position. The opening of the valve 123 causes the intake suction to actuate the diaphragm 101, which results in the shift throttle 43 being closed by the inward movement of the rod 104 and the cam 108. The inward movement of the rod 104 also causes motion to be transmitted through the link 119, the rock shaft 116 and the link 115 to the valve element 150. The motion thus imparted is in a direction to cause outward movement of the valve element 150 which results in the cylinder 31 of the clutch operating unit 30 being connected with the intake manifold through the conduit 148. Thereupon the piston of the clutch cylinder 31 is moved inwardly and causes the lever 152 to actuate the clutch shaft 32 in a direction to disengage the clutch. This movement of the clutch lever 152 causes motion to be transmitted through the link 173 to the lever 170 which causes outward movement of the valve element 165. This movement of the valve element 165 causes the cylinder 156 of the shifter operating unit 35 to be connected with the intake manifold through the conduits 163, 166 and 148, and to be closed to the atmosphere. This results in inward movement of the piston 157 of the shift cylinder and causes motion to be transmitted to the shift lever 22 through the snap action device 155 and the link 182 to thereby move the lever 22 to the first speed position A. During this operation the "leaky" check valve 161 causes the inward or power stroke of the piston 157 to take place at a desired relatively slow rate but permits the return stroke of the piston to take place rapidly. In Fig. 3 of the drawings I show the shift lever 22 in the neutral position, and in Fig. 5 I show the relative positions of the parts of the snap action device 155 just prior to the movement of the shift lever to the first speed position. Fig. 4 shows the shift lever 22 and the other parts after the shift from neutral to first speed has been completed.

As the lever 22 moves into first speed position A, the completion switch 218 is opened momentarily to break the holding circuit and cause deenergization of the solenoid 124. Deenergization of this solenoid allows the valve 123 to move inwardly to its closed position and allows the shift throttle to be reopened and the vacuum valve 150 to be closed to the manifold and opened to the atmosphere. The movement of the lever 22 into the first speed position A also causes opening of the inhibitor switch 231 which, as explained above, will prevent the apparatus from attempting to shift to a higher transmission ratio position even should the operating conditions of the vehicle indicate the need for such shift. This is desirable since the transmission is now in its highest transmission ratio position.

With the vehicle now traveling ahead in first speed the operator simply depresses the accelerator to increase the speed of the vehicle, and as the vehicle speed increases a condition is reached where the engine is operating at a relatively high speed and the flow of fluid through the intake conduit 42 is taking place at a relatively high velocity. As soon as the intake velocity and vacuum increase above predetermined values the diaphragms 48 and 51 are flexed toward each other, thereby causing the switches 85 and 86 to be closed. When this occurs the solenoid 124 is energized and the same operation as above explained is repeated to cause closing of the shift throttle 43, disengagement of the clutch by operation of the clutch cylinder 31, and shifting of the lever 22 into the second speed position B by the operation of the shift cylinder 156. Movement of the lever 22 into second speed position B momentarily opens the completion switch 218 for the purpose above explained, and also causes closing of the gate inhibitor switch 232 so that a succeeding shift, either upwardly or downwardly as determined by the brain unit, can be made automatically. It will be noted that at this time the other inhibitor switches 231, 233, and 234 are all closed.

Since the operator is holding the accelerator of the vehicle in a depressed condition, the speed of the engine and of the vehicle again begins to increase immediately following the shifting of the lever 22 into the second speed position B. When the speed of the engine has increased to the point where the intake velocity and the vacuum are again above the predetermined values, the diaphragms 48 and 51 are again flexed and the switches 85 and 86 are closed, thereby to initiate a further "up" shift of the lever 22. This shift is carried out in substantially the manner just explained above except that during this shift the gate solenoid 201 is energized and the gate 200 is closed. The shift is completed by movement of the lever 22 into the high speed position C, which causes momentary opening of the completion switch 218 and opens the inhibitor switch 233, and results in deenergization of the solenoid 201 and retraction or opening of the gate 200.

During the travel of the vehicle with the shift lever 22 in the high speed position C, let it be assumed that the load on the vehicle increases in such a manner as might occur when the vehicle climbs a steep grade. The increased load causes a slowing down of the engine in spite of the operator depressing the throttle to increase the fuel supply. The condition of operation now is that the engine is exerting maximum torque at slow speed and the throttle is practically wide open. In this condition of operation the engine is overloaded and as soon as the vacuum in the intake falls below a predetermined value, as the result of this existing condition, the diaphragm 51 is flexed in the opposite direction, that is, away from diaphragm 48 by the tension spring 74. This movement of the diaphragm 51 causes the switch 87 to be closed. The closing of the switch 87 causes energization of the solenoid 124, which results in the operation of the shift throttle 43, the clutch device 31 and the shift cylinder 156, in timed relation to produce a down shift of the lever 22 from the high speed position C to the second speed position B. The completion of the shift causes momentary opening and immediate reclosing of the completion switch 218 and the closing of the inhibitor switch 232.

If the overload condition continues after the down shift from the high speed position C to the second speed position B, a second down shift will be automatically brought about to cause the lever 22 to be shifted from the second speed position B to the first speed position A. During this shift the gate solenoid 201 is not energized and consequently the gate 200 is not closed. If the overload condition ceases and the engine speed again builds up, an automatic shift will be made from the first speed position A back to the second speed position B in the manner explained above.

For connecting the various electric switches and solenoids of my speed change apparatus, I provide a network of conductors whereby the required electrical circuits can be established. In this network of conductors I provide a point or connection X so arranged that, when this point is connected to ground by any one of various circuits, the solenoid 124 will be energized and a shift of the lever 22 will be automatically made. For example, when the lever 22 is to be shifted from neutral into first speed position A, as in the case of the example explained above, the lever 256 of the dash control switch 254 is moved toward the left. This movement of the switch lever causes the contact arm 269 to make contact with the plate 265, and this establishes an energizing circuit for the solenoid 124. This circuit can be traced from the ground connection 350 through contact arm 269 and contact plate 265, through conductor 351 to point X, and then through switch 281 and conductor 352 to the winding of the solenoid 124. From this winding the circuit continues through conductor 353, master switch 289, conductor 288, ignition switch 285, and conductor 286 to the battery 283, and then through ground connection 284.

As explained above, the operation of the valve 123 by the solenoid 124 causes the synchronizing switch 131 and the holding switch 134 to be closed. The closing of the switch 134 establishes a holding circuit for the electromagnet 124. This holding circuit may be traced as follows: From ground connection 355 through the contact plate 273 of the dash switch 255, through contact arm 277 and through conductor 356 to completion switch 218, then through conductor 357, through holding switch 134 to the solenoid winding 128 and then back to ground through conductor 353, switch 289, conductor 288, switch 285, and conductor 286 and the battery 283.

In the case of each shift made by the apparatus, this holding circuit remains energized until the completion of the shift, whereupon the momentary opening of the completion switch 218 in the manner explained above, deenergizes the holding circuit and the solenoid 124 to allow the shift throttle 43 to be reopened and the valve 123 to be moved to its inward position. The deenergizing of the holding circuit and the immediate reclosing of the completion switch at the completion of each shift restores the electric control mechanism and circuits to a condition of readiness for the next shift to be made.

Assuming now that the shift lever 22 has been moved to the first speed position A and that the diaphragms 48 and 51 of the brain unit have been flexed in response to changes in the operating conditions to close switches 85 and 86 and to cause a shift from the first speed position A to the second speed position B, a control circuit is thereby established as follows: From ground connection 358 through the normally closed clutch switch 250, through the reverse position inhibitor switch 234, through neutral position inhibitor switch 235, through third speed position inhibitor switch 233, and then through conductor 359 to switch 86, through conductor 360, and through switch 85, and thence to point X through conductor 361. Since point X has now been grounded, the solenoid 124 will be energized and the shift will be automatically made from the first speed position to the second speed position B.

When the shift lever 22 is in second speed position B and the brain unit calls for an "up" shift to high speed position C, the control circuit established is as follows: From ground connection 358 through clutch pedal switch 250 and thence through switches 234, 235, and 233 in succession, and then through conductor 359, switches 86 and 85 in succession to point X through conductor 361. The circuit thus established energizes the solenoid 124 to initiate the shift. At the time that this circuit is established, it will be noted that the shift lever 22 is holding the inhibitor switch 232 closed. At this time the gate 200 must be moved forwardly to prevent the shift lever from passing through the neutral space when the shift from second speed position B to high speed position C is to be made.

The desired forward movement of the gate 200 is caused by energization of the solenoid 201 which is brought about by the closing of the synchronizing switch 131. The energizing circuit for the gate solenoid may be traced as follows: From ground connection 358 through switches 250, 234, 235, and 233 in succession, and then through conductor 359 and through the lower arm of the switch 86 and the metal ring 94 of the clamping member 77 to single contact switch 88, and then through shift throttle switch 280 and conductor 362, and then through synchronizing switch 131, conductor 363, and through inhibitor switch 232, then through conductor 364 and contact plate 266 of switch 254, and then through contact arm 272, conductor 365 to the winding of the solenoid 201, and then back to ground through conductor 366, switch 289, conductor 288, switch 285, conductor 286, and battery 283.

When the shift lever 22 is in high speed position C or second speed position B, and the brain unit calls for a "down" shift, the following circuit is established for grounding the point X to cause energization of the solenoid 124: From ground connection 358 through clutch pedal switch 250, then through inhibitor switches 234, 235, and 231 in succession, and then through conductor 367 and through switch 87 to point X.

When the shift lever 22 is in any one of the four positions A, B, C, and R, a shift can be made to put this lever in neutral position by simply swinging the lever 257 of the dash switch 255 to the right. The circuit thus established may be traced as follows: From ground through conductor 355 to switch plate 273 and the arm 279' thereof, then through contact finger 279, conductor 278', and conductor 351 to point X. The point X having thus been grounded, a shift is thereupon initiated, which includes the completing of the holding circuit for the solenoid 124. In initiating the shift, the operator moves the switch lever 255 to the right to establish the above circuits and holds this lever in such right-hand position until the shift to neutral position has been completed.

Since the desired shift is to neutral position, the neutral switch 235 must be included in a circuit such that it will serve as a completion switch and cause the shift to end upon the opening thereof by the movement of the shift lever 22 into the neutral slot N. This latter circuit may be traced as follows: From battery 283, through conductor 286, switch 285, conductor 288, switch 289, conductor 353, solenoid 124, holding switch 134, conductor 357, switch 218, conductor 356, switch finger 277, switch plate 274, switch finger 276, conductor 356b, neutral switch 235, conductor 356a, switch finger 278, switch plate 273, and back to battery through ground connections 355 and 284. Switch lever 257 has an operating connection with switch lever 256, through the dog 256' and link 255' as explained above, such as to cause the latter switch lever to move to the left when the former switch lever is moved to the right for a shift to neutral. This movement of lever 256 causes switch plate 266 to move out of contact with switch finger 279, which movement prevents the energizing of gate solenoid 201.

In Figs. 8 and 9 of the drawings I have shown my invention embodied in a device for automatically signalling to a vehicle operator the proper time to make a manual shift in the transmission ratio or setting. This automatic signalling apparatus, as will be presently explained, determines and signals the time and nature of the shift in accordance with operating conditions of the vehicle, and is especially useful in connection with the internal combustion engines of trucks, busses, and like vehicles.

The automatic signalling apparatus includes a brain unit 300 which is of similar construction to the above described brain unit 25, and signal circuits controlled by the brain unit. This brain unit is provided with a diaphragm casing 301 and with a fuel intake fitting or connection 302. The diaphragm casing 301 and the intake fitting 302 may, if desired, be formed as an integral unit, with the intake fitting constructed in the nature of an insert adapted to be clamped between the carburetor 303 and the intake manifold 304, as represented in Fig. 9.

The diaphragm casing 301 is constructed with chambers 305 and 306 which are, in turn, separated into compartments by transverse flexible diaphragms 307 and 308. The diaphragm 307 divides the chamber 305 into compartments 309 and 310 and the diaphragm 308 divides the chamber 306 into compartments 311 and 312. The diaphragm 307 may be referred to as the velocity diaphragm because, as will be presently explained, it responds to changes in the velocity of flow of the fuel mixture through the passage 314 of the intake fitting 302. Similarly, the diaphragm 308 may be referred to as the vacuum diaphragm because it responds to changes in vacuum or subatmospheric pressure occurring in the conduit 314 of the intake fitting 302. To enable the diaphragm 307 to respond to velocity changes, I connect the compartments 309 and 310, respectively, with the conduit 314 of the intake fitting through the passages 315 and 316. The outer end of the passage 315 communicates with the compartment 309 through the port 317. To enable the diaphragm 308 to respond to vacuum changes, the compartment 311 is connected with the intake conduit 314 through the port 318 and the passage 315, and the compartment 312 on the opposite side of the diaphragm is connected with atmosphere through the vent passage 319.

Adjustment of the flexing of the diaphragms 307 and 308 may be made by providing tension springs 320 and 321 which act on the respective diaphragms and can be varied in tension by means of the adjusting nuts 322 and 323. A screw 95a may be provided in the same location and for the same purpose as the screw 95 of Fig. 3.

Clamping members 324 and 325 formed of insulating material are arranged to be moved by the respective diaphragms to cause actuation of electric switches associated with the chambers of the diaphragm casing. One of these switches, here designated 326, extends into the compartment 310 and has normally open contacts 327 which are adapted to be closed by movement of the clamping member 324 in response to flexing of the diaphragm 307. Switches 330 and 331 project into the compartment 312 on opposite sides of a flange 332 of the clamping member 325. The switch 330 has normally open contacts 333 which are closed upon movement of the diaphragm 308 in one direction, and the switch 331 has normally open contacts 334 adapted to be closed upon movement of the diaphragm 308 in the opposite direction.

As shown in Fig. 9 of the drawings, the intake fitting 302 is constructed with a restriction 335 therein which is shaped to constitute a Venturi tube. The passage 316 communicates with the full bore of the intake conduit 314 through a port 336, and the passage 315 communicates with the throat 337 of the Venturi tube through a port 338 which is spaced axially from the port 336. The provision of the Venturi tube and the arrangement of the ports 336 and 338, as just described, enables the diaphragm 307 to respond to changes in the velocity of the intake fluid and enables the diaphragm 308 to respond to changes in the vacuum. The combined effect of diaphragms 307 and 308, operating in response to changing conditions in the intake, is to enable the brain unit 300 to determine, in a manner already explained, when a change should be made in the transmission ratio as required by changes in the speed and load conditions under which the vehicle is operating.

For signalling to the vehicle operator the time and nature of the shift needed in the transmission ratio, I provide signalling means preferably in the form of a pair of electric lamps 340 and 341. The lamp 340 is arranged to be lighted whenever operating conditions are such that the operator of the vehicle should shift to a transmission ratio which will afford a higher vehicle speed, and the lamp 341 is arranged to be lighted whenever operating conditions are such that the operator should shift to a lower speed transmission ratio. The lamp 340 may be conveniently referred to as the "up" signal lamp and the lamp 341 may be conveniently referred to as the "down" signal lamp. A storage battery 342 may be provided for supplying current for operating the lamps 340 and 341. Circuit connections are provided between the lamps and the switches, such that, whenever the contacts of the switch 331 are closed, the "down" signal lamp will be lighted, and whenever the contacts of the switch 326 and the contacts of the switch 330 are closed at the same time the "up" signal lamp 340 will be lighted.

From the automatic signalling apparatus just described it will be seen that, as engine speed and load conditions change, the operator of the vehicle will be informed when to shift from one transmission ratio to another and will be informed whether the shift should be "up" or "down". This automatic signalling apparatus can be advantageously used on trucks, busses, and other motor vehicles, and will facilitate the operation, and will contribute to the economy and smoothness of performance, of those vehicles because the operator will always be correctly informed as to the time and nature of shift which should be made in the transmission ratio.

From the foregoing description and accompanying drawings it will now be readily understood that I have provided novel speed control apparatus which is efficient, sensitive, and practical, and which embodies novel mechanical devices and control or signal circuit arrangements for initiating and carrying out desired or needed changes in the power transmission ratio.

Having thus described my invention, I claim:

1. In combination, an internal combustion engine having an intake, a transmission providing a plurality of power transmission ratios, automatically operable means for shifting from one ratio to another, and means operable automatically in response to changes in intake pressure and velocity for controlling the first mentioned automatic means.

2. In combination, an internal combustion engine having an intake, a transmission providing a plurality of power transmission ratios, automatically operable means for shifting from one ratio to another including a power device, a control for said power device, and means operated automatically in response to changes in intake pressure and velocity for actuating said control.

3. In combination, an internal combustion engine having an intake, a transmission having a plurality of shifts corresponding with different power transmission ratios, means for shifting from one ratio to another, and means operable in response to changes in intake pressure and velocity for automatically determining when the shift from one ratio to another should be made.

4. In combination, an internal combustion engine having an intake, a transmission having a plurality of shifts corresponding with different power transmission ratios, manual means for shifting from one ratio to another, and means operable in response to changes in intake pressure and velocity for automatically indicating when the shift from one ratio to another should be made.

5. In combination, an internal combustion engine, a transmission providing a plurality of power transmission ratios and having manual means for making a shift from one ratio to another, and signaling means operable automatically in response to engine speed and torque for indicating when a shift from one ratio to another should be made.

6. In combination, an internal combustion engine having an intake, a transmission providing a plurality of power transmission ratios and having means for shifting from one ratio to another, a throttle for the engine, and means responsive to changes in intake pressure and velocity for automatically actuating said throttle during the shifting.

7. In combination, an internal combustion engine having an intake, a transmission having a plurality of power transmission ratios and means for shifting from one ratio to another, a manually operable throttle for controlling said engine during operation in one of said transmission ratios, a second throttle operable to control the speed of said engine during such shifting, a power device for actuating said second throttle, and means for automatically controlling said power device in response to variation in intake pressure and velocity.

8. In combination, an internal combustion engine having an intake, a transmission providing a plurality of power transmission ratios, means operable for shifting from one ratio to another, a throttle for the engine, and means automatically operable in response to changes in intake pressure and velocity for controlling said shifting means and actuating said throttle.

9. In combination, an internal combustion engine having an intake, a transmission providing a variable power transmission ratio, a clutch for said engine, means operable for disengaging and reengaging said clutch, means operable to vary the transmission ratio, a throttle for the engine, and means responsive to changes in intake pressure and velocity for automatically actuating said clutch operating means, said shifting means and said throttle.

10. In combination, an internal combustion engine having an intake, a transmission providing a plurality of power transmission ratios, a clutch for said engine, means for disengaging and reengaging said clutch comprising a power device and a control therefor, means for shifting from one ratio to another comprising a power device and a control therefor, a throttle for said engine, and means responsive to changes in intake pressure and velocity for automatically actuating said controls and said throttle.

11. In combination, an internal combustion engine having an intake, a transmission providing a plurality of power transmission ratios, a clutch for said engine, means for disengaging and reengaging said clutch comprising a power device and a control therefor, means for shifting from one ratio to another comprising a power device and a control therefor actuated in timed relation to the operation of the clutch power device, a throttle for said engine, a power device for actuating said throttle and the clutch power device control, a control for the last mentioned power device, and means actuated in response to changes in intake pressure and velocity for causing actuation of the last mentioned control.

12. In combination with an internal combustion engine having an intake, an automatic control device comprising a casing having a chamber divided into a pair of compartments by a movable medium, means providing said intake with a restriction, and conduits connecting the compartments respectively with said intake substantially at said restriction and at a point spaced from said restriction.

13. In combination with an internal combustion engine having an intake, an automatic control device comprising a casing having a chamber divided into a pair of compartments by a movable medium, means providing said intake with a restriction, conduits connecting the compartments respectively with said intake substantially at said restriction and at a point spaced from said restriction, and a switch adapted to be actuated by said movable medium.

14. In combination with an internal combustion engine having an intake, an automatic control device comprising a casing having a chamber divided into a pair of compartments by a movable medium, means providing said intake with a Venturi tube, conduits connecting said compartments with said Venturi tube to cause movement of said medium in response to changes in the velocity of the intake fluid, and a control adapted to be actuated by movement of said medium.

15. In combination with an internal combustion engine having an intake, an automatic control device comprising a casing having a chamber divided into a pair of compartments by a movable medium, a second movable medium separating one of said compartments from atmosphere, means providing said intake with a Venturi tube, conduits connecting said chambers with said Venturi tube whereby one movable medium responds to changes in intake velocity and the other movable medium responds to variations between intake pressure and atmosphere, and control means adapted to be actuated by movement of the medii.

16. In combination with an internal combustion engine having an intake, an automatic control device comprising a casing having a plurality of chambers, a movable medium dividing each chamber into a pair of compartments, means providing said intake with a Venturi tube, means connecting one compartment of each pair with the throat of the Venturi tube, the remaining compartment of one pair being connected to atmosphere and the remaining compartment of the other air being connected with the Venturi tube at a point spaced from said throat, and electric switches adapted to be actuated by movement of the medii.

17. In combination with an internal combustion engine having an intake, an automatic control device comprising a casing having a chamber divided into a pair of compartments by a movable medium, a second movable medium separating one of said compartments from atmosphere, means providing said intake with a Venturi tube, conduits connecting said chambers with said Venturi tube whereby one movable medium responds to changes in intake velocity and the other movable medium responds to variations between intake pressure and atmosphere, electric switches adapted to be actuated by movement of said medii, and an electric control circuit having said switches therein in series.

18. In combination, an internal combustion engine having an intake, a power transmitting device operably connected with the engine and having settings providing different transmission ratios, means operable to shift from one setting to another, a casing having a chamber divided into a plurality of compartments by a movable medium, means providing said intake with a Venturi tube, conduits connecting said compartments with said Venturi tube to cause movement of said medium in response to changes in the velocity of the intake fluid, and a control for the shift means arranged to be actuated by movement of said medium.

19. In combination, an internal combustion engine having an intake, a power transmitting device operably connected with the engine and having settings providing different transmission ratios, means operable to shift from one setting to another, a casing having a chamber divided into a pair of compartments by a movable medium, a second movable medium separating one of said compartments from atmosphere, means connecting said compartments with said intake whereby one movable medium responds to changes in intake velocity and the other movable medium responds to changes between intake pressure and atmosphere, and means actuated by movement of said medii for controlling said shift means.

20. In combination, an internal combustion engine having an intake, a power transmitting device operably connected with the engine and having settings providing different transmission ratios, means operable to shift from one setting to another, a casing having a chamber divided into a pair of compartments by a movable medium, a second movable medium separating one of said compartments from atmosphere, means connecting said compartments with said intake whereby one movable medium responds to changes in intake velocity and the other movable medium responds to changes between intake pressure and atmosphere, means actuated by movement of said medii for controlling said shift means, a throttle in said intake, and means for actuating said throttle in timed relation to the operation of said shift means.

21. In combination, an internal combustion engine having an intake, a power transmitting device operably connected with the engine and having settings providing different transmission ratios, means operable to shift from one setting to another, a casing having a chamber divided into a pair of compartments by a movable medium, a second movable medium separating one of said compartments from atmosphere, means connecting said compartments with said intake whereby one movable medium responds to changes in intake velocity and the other movable medium responds to changes between intake pressure and atmosphere, means actuated by movement of said medii for controlling said shift means, a throttle in said intake, a clutch operable to disconnect and reconnect said transmitting device and engine, and means for actuating said clutch and throttle in timed relation to the operation of said shift means.

22. In combination with a power transmitting device having different ratio settings and means adapted to be operated by pushing and pulling forces for shifting from one ratio setting to another, a cylinder having a single acting reciprocable power member, and snap action mechanism operably connecting said reciprocable member with said shifting means whereby successive power strokes of said reciprocable member in the same direction cause alternate pushing and pulling forces to be supplied to said shifting means.

23. In combination with a power transmitting device having different ratio settings and means adapted to be operated by pushing and pulling forces for shifting from one ratio setting to another, a reciprocable power member, and means operably connecting said reciprocable member with said shifting means comprising a link extending diagonally to the direction of shift movement and through which pushing and pulling forces are applied to the shifting means and snap action mechanism between said reciprocable member and said link and operable to reverse the direction of force application to the latter.

24. In combination with a power transmitting device having a shiftable speed control member, a rotary shaft spaced from said control member, a link connected with said control member, means providing a connection between said shaft and link for imparting pushing and pulling movements to the link upon rotation of the shaft, a motor having a reciprocable power shaft, and snap action means connecting the reciprocable shaft with the rotary shaft whereby successive power strokes of the reciprocable shaft cause the rotary shaft to turn alternately in opposite direction.

25. In combination with a power transmitting device having spaced groups of different ratio settings, a member for shifting from one ratio setting to another and being movable into any setting of one group by a pulling force and into any setting of another group by a pushing force, a reciprocable power member, means operably connecting said reciprocable member and said shifting member including a snap action mechanism operable to reverse the direction of force application whereby successive power strokes of said reciprocable member in the same direction cause alternate pushing and pulling movements to be supplied to the shifting member, and means for causing the shifting member to move into a predetermined setting of one of said groups.

26. In combination, an internal combustion engine, a transmission providing a plurality of different power transmission ratios and having means for shifting from one ratio to another including a movable shifter member, means automatically responsive to changes in the operating conditions of the engine for initiating a shift in the transmission ratio, and means for insuring the completion of a shift initiated by said responsive means comprising a control arranged to be engaged by said shifter member and actuated thereby only upon completion of the shift.

27. In combination, an internal combustion engine, a transmission providing a plurality of different power transmission ratios including a lowest ratio and a highest ratio and having means for shifting from one ratio to another, means for actuating the shifting means, means automatically responsive to changes in the operating conditions of the engine for controlling said actuating means including a plurality of electric circuits, and inhibitor switches in said circuits for preventing the automatic means from attempting to cause a shift to a ratio above said highest ratio or below said lowest ratio.

28. In combination, an internal combustion engine having an intake, a transmission providing a plurality of power transmission ratios and having means for shifting from one ratio to another, a throttle for controlling the engine while a shift is being made, a power device for actuating said throttle, means responsive to changes in intake pressure and velocity for automatically controlling said power device including an electromagnet and a holding circuit for keeping the electromagnet energized, and a switch for opening the holding circuit when the shift has been completed.

29. In combination, an internal combustion engine having an intake, a transmission providing a plurality of power transmission ratios and having means for shifting from one ratio to another, a clutch for the engine, a throttle for controlling the engine while a shift is being made, a power device for actuating said throttle, a power device for actuating said clutch, means responsive to changes in intake pressure and velocity for automatically controlling said power devices including an electromagnet and a holding circuit for keeping the electromagnet energized, and a switch for opening the holding circuit when the shift has been completed.

KARL B. BRITTON.